United States Patent [19]

Matteson et al.

[11] Patent Number: 4,761,683

[45] Date of Patent: Aug. 2, 1988

[54] CHARGE TRANSFER IN MULTIPLE SENSOR ROW ARRAYS

[75] Inventors: Ronald G. Matteson, Walworth; Jagdish C. Tandon, Fairport, both of N.Y.

[73] Assignee: Xerox Corporation, Stamford, Conn.

[21] Appl. No.: 943,337

[22] Filed: Dec. 18, 1986

[51] Int. Cl.⁴ .................. H04N 9/07; H04N 1/028
[52] U.S. Cl. .................................. 358/75; 358/74; 358/213.26
[58] Field of Search .............. 358/75, 78, 213.25, 358/213.26, 213.29, 44, 294

[56] References Cited

U.S. PATENT DOCUMENTS

| | | | |
|---|---|---|---|
| 3,940,602 | 2/1976 | Lagnado et al. | 235/181 |
| 4,244,003 | 1/1981 | Poetsch et al. | 358/50 |
| 4,271,428 | 6/1981 | Herbst | 358/54 |
| 4,271,429 | 6/1981 | Herbst | 358/54 |
| 4,329,709 | 5/1982 | Masuda et al. | 358/44 |
| 4,353,084 | 10/1982 | Herbst et al. | 357/30 |
| 4,432,017 | 2/1984 | Stoffel et al. | 358/213.26 |
| 4,438,457 | 3/1984 | Tandon et al. | 358/213.26 |
| 4,675,727 | 6/1987 | Sekizawa et al. | 358/75 |

FOREIGN PATENT DOCUMENTS 62-147766 7/1987 Japan .

Primary Examiner—Tommy P. Chin
Assistant Examiner—Robert M. Bauer
Attorney, Agent, or Firm—Mark Costello

[57] ABSTRACT

A scanner system for detecting images on a surface and generating an electronic representation thereof for transmission to an image processing system, including at least first, second and third rows of n sensors generating charges representative of detected light of preselected wavelengths during an integration period of a selected duration. Each row of sensors is comprised of substantially similar construction, and suitable for detection of a preselected wavelength, Sensors may be chosen from a sensor type which facilitates transfer of charges through the sensor. The sensor rows are provided with discharge paths interconnecting each sensor in a row in charge passing relationship with a sensor in a successive row, and a storage device, whereby sensors in a first row are discharged to a storage device through sensors in the second and third rows; sensors in a second row are discharged to a storage device through corresponding sensors in a third row; and sensors in a third row are discharged into a storage device prior to transmission of charges as output information. The charges are passed to the storage device between integration periods. A new integration period may be started as soon as data from the first row sensors reaches a storage device.

20 Claims, 4 Drawing Sheets

CHARGE TRANSFER IN MULTIPLE SENSOR ROW ARRAYS

The present invention relates primarily to a raster input scanning device, and more particularly to raster input scanners having color sensor arrays for deriving color information from a scanned image.

INCORPORATION BY REFERENCE

For the purpose of background information on scanned image technology U.S. Pat. No. 4,506,301, having the same assignee as the present invention, is hereby incorporated by reference.

BACKGROUND OF THE INVENTION

Raster input scanning devices of the type contemplated generally include an array of photoelectric sensors or detectors or photosites arranged across an image scanning field for detecting light from an image; a data transmission and processing system for taking the image data derived from the photoelectric detectors and passing the image information to a data processing system, such as a microprocessor; and a transport for relative movement of the image to be scanned across the scanning field so that photoelectric sensors extending transversely across the image field direction of motion are able to detect on a scan line-by-scan line basis the images on the scanned surface. Of particular interest is the processing of color images. In color image scanning, the scanned image must be broken into component colors, each of which is processed separately for later inclusion with the assimilation of the entire image at a later time. This may be done in a variety of ways. In the past, the entire image was scanned, for example three times, each time with a different color filter superimposed over the scanned image. Thus, each scanning operation produced selected color information based on the filter over the image. In such a system, the detectors are able to detect only the difference between a light and dark image, and may use detectors similar to those detecting only black and white information.

With the development of color filter sensors, which provide photosites with color filters, and the ability to make longer arrays of photosites, it has become possible to provide scanning systems requiring only a single pass of the image. In these systems, a large amount of data is created by the photosites requiring fast handling of the data by image processing systems, and, particularly, within the array itself. Speed in which the document can be read is dependent on the time in which data derived by the photosites can be transmitted to the processing system. For example, if it is desired to move the image surface in a Y-direction at a speed of 1 inch/sec (approximately 2.54 cm/sec), and a resolution of 300 scan lines/inch (approximately 118 scan lines/cm) is desired, it becomes necessary to move data from 300 scan lines of data per second from the photosites to the processor. Since the arrays may range along the X-direction in length from 3500 to in excess of 5100 photosites, it will be appreciated that a large amount of information must be handled to achieve the required processing speed.

A commercial product by Toshiba Corporation, Model No. TCD 112, provides a sensor arrangement having an arrangement including a plurality of arrays in offset and overlapping relationship to cover the X-direction of an image field. This product splits each individual photosite into three sites each with a color filter. Color image information may be derived from the sensors, and is passed in sequential fashion to a data processor. It would be preferable, however, to provide an array with larger photosites since a larger photosite is more sensitive to the light focused thereon and allows the documents to be scanned at a higher rate of speed. Additionally, the overlapping and offset arrangement of the TCD 112 makes it difficult to align the segments. Thus, extensive processing of the signal is required to compensate for the offset alignment of the arrays.

SUMMARY OF THE INVENTION

The primary object of the present invention is to provide a new photosite sensor array arrangement suitable for use in a color image raster input scanning system.

Another object of the invention is to provide an arrangement of photosites in a color sensor array which facilitates the transfer of large amounts of image information out of the photosites in a short amount of time.

Yet another object of the present invention is to provide a sensor array arrangement using color filter sensors for detecting the light from an image in selected wavelengths.

Still another object of the present invention is to provide a color sensor array which is easily aligned and is capable of fast scanning speeds while maintaining a high quality of picture or image resolution.

In accordance with the objects of the present invention, a scanner system is provided for detecting images on a preselected surface, and generating an electronic representation of the image for transmission to an image processing system, the sensor array in the scanning system including at least first, second and third parallel rows of n sensors for generating charges representative of light detected by the sensors. The sensors in each one of the rows are of substantially similar construction, and suitable for detection of a preselected wavelength. The sensors in at least the second and third rows are chosen from a sensor type facilitating the transfer of charges into and out of the sensor. The sensors in each row are provided with transfer paths interconnecting each row with a successive position whereby sensors in a first row transfer charge into a second row, sensors in a second row transfer charge into a third row and sensors in a third row transfer charge successively into a storage means prior to transmission of said charges as output information.

The above-described arrangement provides for an array extending across the entire image field detecting the entire X-direction of an image to be scanned so that no alignment of the arrays is required in this respect. Large photosites may be used in each row, as a single row of photosites detects only a particular light wavelength, while succeeding similar rows detect other wavelengths. Thus, the available array space does not need to be divided for the purpose of providing color photosites on a single array. This arrangement maintains the sensitivity of the array at a high level, and allows shorter integration times to be utilized, thereby increasing the speed of image reading.

A further advantage of the present invention exists in the information handling ability of the array. The inventive arrangement allows the sensor portion of the array to begin sensing new information, while the information handling portion of the array continues to transmit the previously acquired data out of the array.

In accordance with another advantage of the present invention, the photosites in the sensor arrays may be comprised of varying devices depending on the optimum use of such devices. Accordingly, a photodetector device having superior response to certain light wavelengths may be easily incorporated into the inventive array since the detection of the selected light frequencies is split among the rows.

Yet another advantage of the present invention is that the color filters provided over the photosites may be laid over the entire row of photosites, rather than provided on a pixel-by-pixel basis over each discrete site.

Still another advantage of the present invention is in the improvement of image resolution by providing a full scan line of the image obtained by each full row of photosites, for each color, rather than having a single scan line divided into multiple colors which must eventually comprise the full scan line. In this manner, the present invention allows more data to be derived from the image, resulting in higher image resolution.

Other objects and advantages of the invention will become apparent from the following description and drawings in which.

Figure 1:
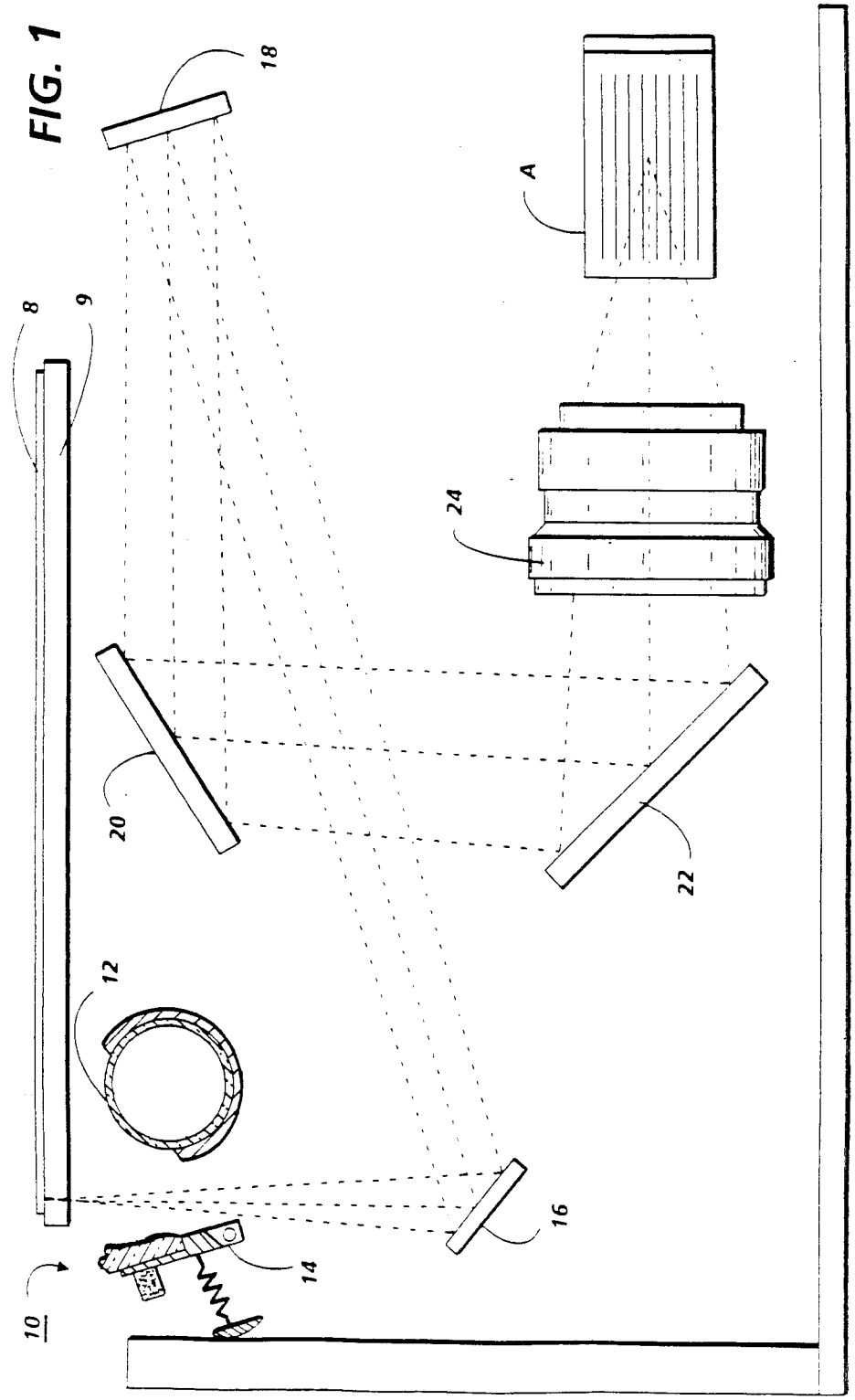
FIG. 1 is a schematic view of an optical assembly in a preferred embodiment of the invention.

Referring now to the drawings wherein the showings are for the purpose of illustrating a preferred embodiment of the invention and not for the purpose of limiting same, FIG. 1 shows, somewhat schematically, an arrangement for an optical system of a raster input scanner of the type contemplated to incorporate the present invention, and providing an image from an original document 8 supported on platen 9 to be scanned by an imaging sensor array A. The optical system of raster input scanner 10 comprises lamp 12 and adjustable reflector 14 for illuminating document 8. Mirrors 16, 18, 20 and 22 direct light reflected from the document 8 to a lens 24 to focus and direct the image on the sensor array A. Information derived from the sensors will be directed to a conventional information or data processing system (not shown). The acquired data will be manipulated as desired for display, storage, etc. It will be appreciated that the present invention is readily applicable to other arrangements. Fiber optic assemblies, or other arrangements of mirrors and lenses, may be used to direct an image to the array. Additionally, it will be appreciated that while the described embodiment scans reflected light, the invention is equally applicable to other optical storage media such as slides, transparencies, aperture cards, etc. Also not shown is a carriage means for moving the document 8 in a longitudinal (Y) direction (left-to-right as viewed in FIG. 1) to successively provide scan lines moving along the document 8 to be scanned by the sensor array. The elements comprising the mechanical and optical systems in a raster input scanner are widely varying and well known in the art, and do not form a part of the present invention.

Figure 2:
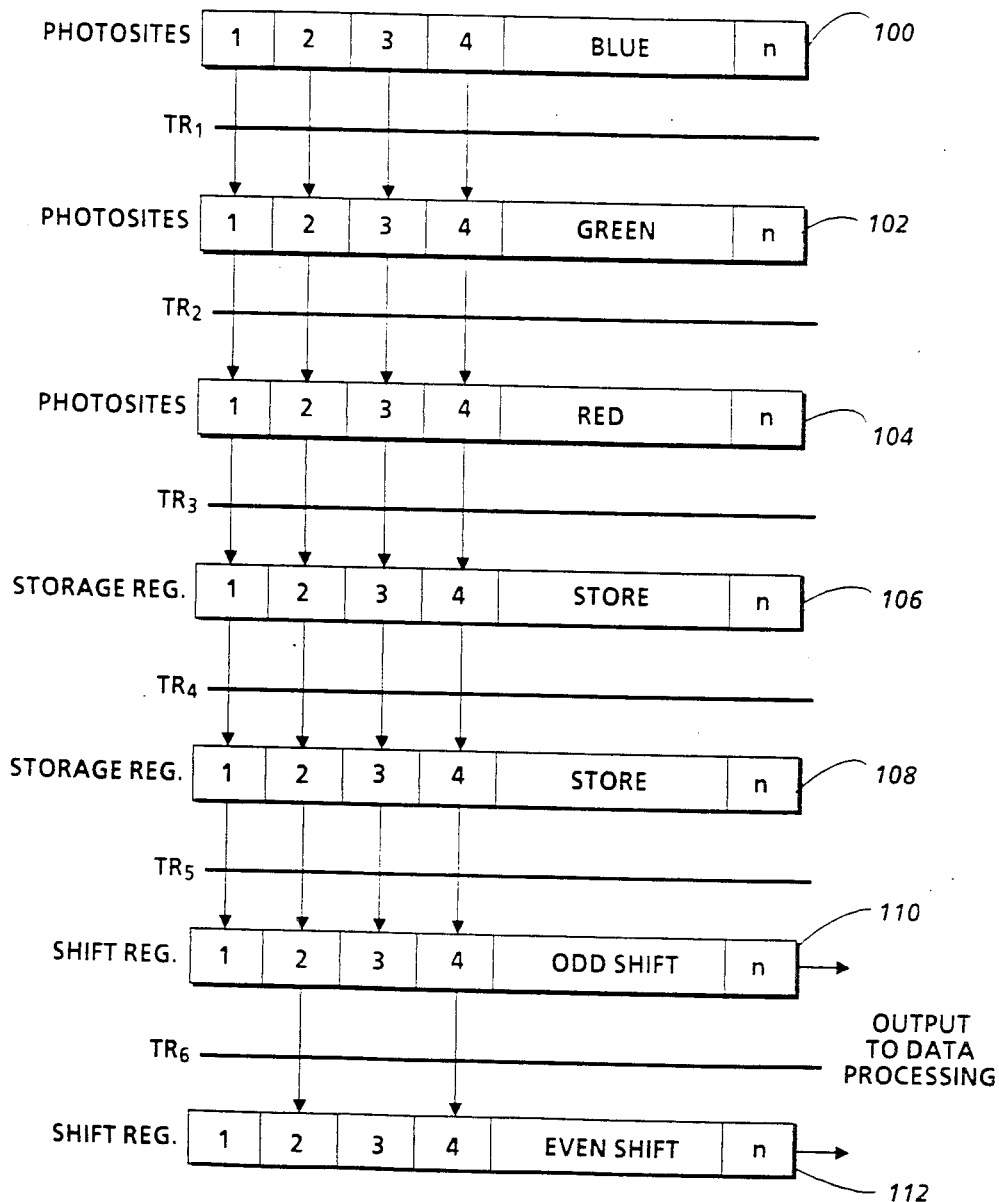
FIG. 2 is a schematic view of a sensor array as contemplated by the present invention.

In accordance with the invention, sensor array A is comprised of at least three parallel rows of sensors comprising photosites 100, 102, 104, best shown in FIG. 2. As will be appreciated, an increase in the number of photosites results in improved image resolution. In a preferred embodiment of the present invention, a photosite row may include upwards of 3500 individual photosites. For the purpose of illustration, however, a limited number of photosites labeled 1,2,3,4 and n are shown as an example. FIG. 2 shows an arrangement including photosite rows 100, 102, 104 arranged to pass information derived from the image to storage means comprising storage registers 106, 108, and from the storage registers 106, 108 to shift registers 110, 112, from which information may be passed to a data processing system (not shown). All three photosite rows 100, 102, 104, as well as the storage registers 106, 108 and shift registers 110, 112, may be provided on a single monolithic chip to form sensor array A. The rows are arranged perpendicularly to the fast scan (Y-axis) direction of image scanning, which is indicated as the vertical direction in FIG. 2.

Photosite rows 100, 102, 104 may be comprised of either photodiodes or charge coupled devices (CCD's). Color filters selected to filter undesired wavelengths of light are arranged over each row of photosites or each photosite. In the present embodiment, photosite rows 102, 104 may be comprised of CCD's, and provided with filters for passing green and red light. Photodiodes often have a better spectral response in the blue light region than CCD's, but do not allow image information to be easily passed through the photosite. Accordingly, photosite row 100 may be comprised of photodiodes and located in the array A furthest away from shift registers 110, 112, so that there will be no requirement that image information pass through such sites, thereby allowing the superior response characteristics of the photodiodes for shorter wavelength to be utilized. It will be appreciated that while these colors have been selected for a preferred embodiment, other color combinations of sensors are possible, and within the scope of the present invention. It is also within the scope of the invention to provide that all of the photosites be comprised of CCD's, rather than mixing types.

Each photosite in photosite rows 100, 102 is connected to a corresponding photosite in a succeeding row, while each photosite in photosite row 104 is connected to a bit in storage register 106 in information transferring relationship, which is in turn connected to storage register 108. In a preferred embodiment of the invention, storage register 108 passes data from alternating bits to either shift register 110, or through shift register 110 to shift register 112 for transmission of the data to the data processor. The transmission of data by two shift registers serves to increase the rate of speed at which image information may be passed to the data processor.

Charges are transferred between adjacent photosite rows, storage or shift registers through transfer gates $TR_n$, indicated by the lines across the path of charge travel between the successive rows in FIG. 2. Thus, photosite row 100 is connected to photosite row 102 through transfer gates $TR_1$, photosite row 102 is connected to photosite row 104 through transfer gates $TR_2$, photosite row 104 is connected to storage register 106 through transfer gates $TR_3$, storage register 106 is connected to storage register 108 transfer gate $TR_4$, storage register 108 is connected to shift register 110 through $TR_5$ and shift register 110 is connected to shift register 112 through $TR_6$. Charge passes between the rows, through the gates, when a high going voltage signal triggers the gates $TR_n$ to a charging passing condition.

Figure 2A:
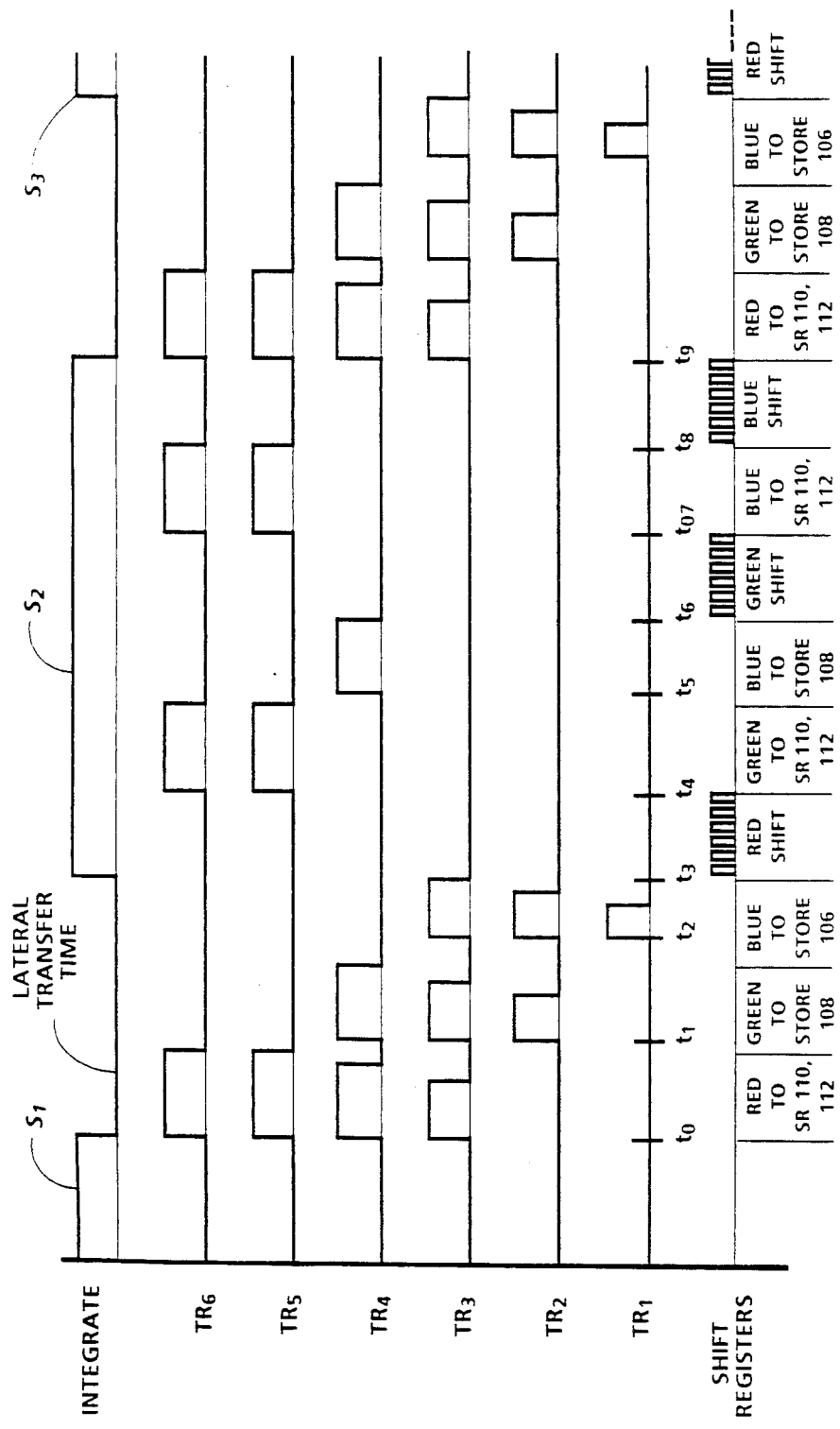
FIG. 2A is a graph demonstrating the operation of the sensor array of FIG. 2 over time.

FIG. 2A shows the operation of array A in FIG. 2 with respect to time (t). The graph labeled INTEGRATE represents successive integration periods or scan times $S_n$ of the scanning device over time (t), or the period between times of data transfer. In the present embodiment, a desirable scan time $S_1$ may be approximately 1/300 sec. or approximately the reciprocal of the desired number of scan lines per second. During scan time $S_1$, photosites in array A are exposed to a selected scan line and store image information or data therefrom as a charge developed at the photosite. As described above, on completion of data acquisition, after a predetermined time, data derived at each photosite in each photosite row will be passed to a corresponding photosite in a succeeding row. FIG. 2A shows approximate relative times for transferring or shifting data from photosite row to photosite row, from photosite row to storage register, from the storage register to storage register, from storage register to shift register, or from shift register to shift register by indicating the relative times at which transfer gates $TR_1$, $TR_2$, $TR_3$, $TR_4$, $TR_5$ and $TR_6$ are opened. As shown in FIG. 2A, data is passed through successive positions in the array, until the data derived thereby has been moved to the storage and shift registers, whereupon a new scan time $S_2$ is commenced, and the process repeated. With each successive shift, color image data derived at a particular row data is moved to succeeding rows until the photosite rows are empty and a new integration period may be started. It will be appreciated that the sensors may continuously sense light reflected from the image to be sensed, but the amount of light received between integration periods, or during data shifting, is relatively small in comparison to the light detected during the defined integration periods, and has little effect on the output image.

As shown in FIG. 2A, at the end of scan time $S_1$, beginning at some time prior to the period demonstrated on the graph, image data derived at each photosite is transferred or shifted to a corresponding photosite in a succeeding photosite row or bit in a storage register. A voltage signal is directed to transfer gates $TR_6$, $TR_5$, $TR_4$, and $TR_3$ at a time $t_0$ as indicated by the substantially simultaneous signals indicated for each in the graphs $TR_6$, $TR_5$, $TR_4$, and $TR_3$ in FIG. 2A. The signal to each of the transfer gates between red detecting photosite row 104 and the shift registers 110 and 112 allows charge data derived at photosites in red detecting photosite row 104 to pass to shift registers 110 and 112. In order to avoid the possibility of the charge flowing back to the photosites after passing to a successive position, transfer gates of the set are successively closed or a non-charge passing condition is created as data passes therethrough, beginning with transfer gate $TR_3$ and moving in the charge passing direction towards transfer gate $TR_6$. Thus, the set of gates $TR_6$, $TR_5$, $TR_4$, and $TR_3$ are simultaneously opened to allow the flow of information derived at red light detecting photosites in row 104 to shift registers 110 and 112. After a selected time, gate $TR_3$ is closed to prevent the back flow of charge thereto, trapping charge in the storage registers and shift registers. Subsequently, $TR_4$ is closed and the charge remains in only storage register 108 and the two shift registers. With the simultaneous closing of gates $TR_5$ and $TR_6$, the red light image data derived at photosite row remains in the shift registers 110 and 112 for passage out of the array A.

Immediately following the arrival of the red light image information at the shift registers, with the photosite row 104 and the storage registers empty, the green light image information derived at photosite row 102 may be moved in a similar manner to storage register. At time $t_1$, a signal is directed to the set of transfer gates $TR_4$, $TR_3$ and $TR_2$ to open those gates for passage of the green light image information derived at photosite row 102 to storage register 108. Again, to prevent the return of the charge to photosite row 102 or storage register 108, the gates are sequentially or successively closed. Thus, after a selected period, gate $TR_2$ is closed to prevent the back flow of charge thereto, trapping charge in the photosite row 104 and the storage registers. Subsequently, $TR_3$ is closed and the charge remains in only storage register 108.

Similarly, charge is moved from blue light detecting photosite row 100. At time $t_2$, a pulse is directed to the set of transfer gates transfer gates $TR_3$, $TR_2$ and $TR_1$ to open those gates for passage of the blue light image information derived at photosite row 100 to storage register 106. Transfer gates $TR_1$, $TR_2$, and $TR_3$ are also sequentially closed to prevent the backflow of charge information.

Thus, at time $t_3$, information has been passed to successive locations emptying each of photosite rows 100, 102, and 104 in succession. The period of shifting data from each photosite row to another position in the array is expected to be, for example, approximately on the order of 1 $\mu$second, with the transfer of all the photosite rows to the storage and shift registers taking on the order 3 $\mu$seconds. With the completion of the transfer of the data in row 100 to storage register 106, photosite rows 100, 102, and 104 are empty and and scanner array A is ready for the next integration period $S_2$ during which it will derive more image information from subsequent scan lines.

Subsequent to transferring image information from the photosite rows to the storage and shift registers, and while new data is being acquired at the photosite rows, image information must be shifted out to the data processing section. Immediately upon completion of the transfer of image data derived at blue light detecting photosite row 100 to storage register 106, data originally derived at red light detecting photosite row 104 is passed from shift registers 110 and 112, as indicated on the SHIFT REGISTER line of FIG. 2A to the data processing system within the time described RED SHIFT. The shift operation takes a relatively long period of time, for example, on the order of 1000 $\mu$seconds and comprises the longest period during the data movement operation.

Subsequent to shifting data originally derived at the red light detecting photosite row 104 out from the array, and with the shift registers 110, 112 now empty, the data originally derived at green light detecting photosite row 102, which at this time is in storage register 108, is moved to the shift registers 110 and 112. To accomplish this a voltage signal is applied to $TR_5$ and $TR_6$ at $t_4$ to open these transfer gates and allow the transfer of the data from storage register 108 to the shift registers 110 and 112. After a predetermined time, the gates are closed to prevent the backflow of the charge from the shift registers to the storage registers. On completion of the transfer of data from storage register 108 to shift registers 110 and 112, storage register 108 is empty, and data from storage register 106, originally derived at blue light detecting photosite row 100, is transferred to storage register 108. Accordingly, at $t_5$, transfer gate $TR_4$ is opened for a predetermined period to allow the transfer of data to storage register 108. At $t_6$ the data in shift registers 110 and 112 is transferred out from the array. At a subsequent $t_6$, the data originally derived at blue light detecting photosite row 100 is transferred from storage register 108 to shift registers 110 and 112, in the same manner as previously described, whereby a voltage signal is applied to $TR_5$ and $TR_6$ at $t_7$ to open these transfer gates and allow the transfer of the data from storage register 108 to the shift registers 110 and 112. The gates are closed after a predetermined time to prevent the backflow of the charge from the shift registers to the storage registers. On completion of the transfer, at a time $t_8$, the data in shift registers 110 and 112 is moved out from the array to, for example, a data processing stage of the device.

With the completion of the transfer of data from the storage and shift registers out of the array, the charge data derived at the photosites since the commencement of scan time $S_2$ may now begin to be transferred out from the photosite rows to the storage and shift registers. Accordingly, at $t_9$, the transfer process may begin again, with the transfer of data derived at red light detecting photosite row 104 to shift registers 110 and 112.

Figure 3:
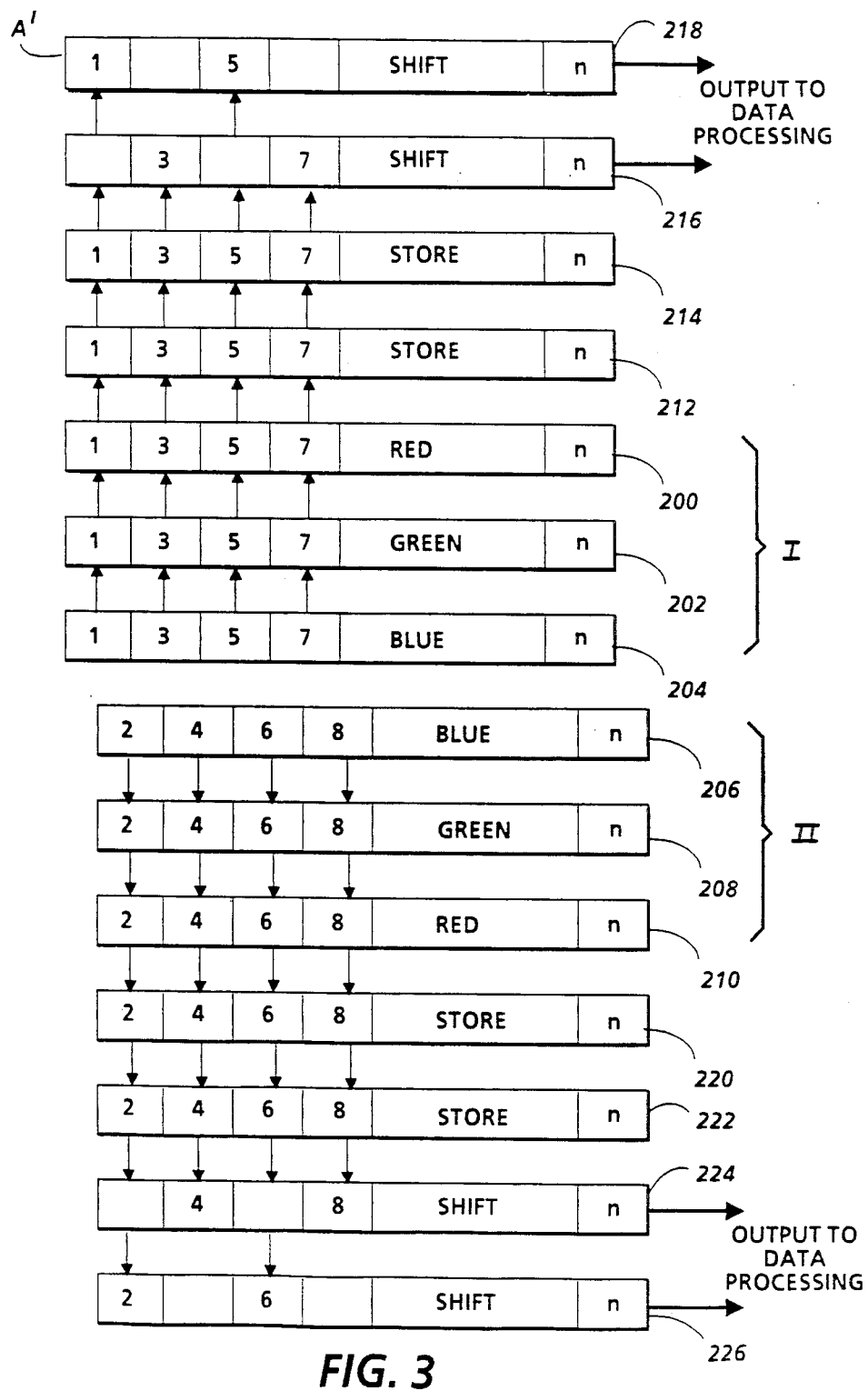
FIG. 3 is a schematic view of another embodiment of a sensor array as contemplated by the present invention.

Referring now to FIG. 3, an array A' includes the array A as shown in FIG. 2, and a mirror image of that array offset by ½ pixel width. The increased number of photosites increases resolution since it provides more photosites per unit of area, and allows a shorter integration period because the period required for integration is dependent on the amount of light detected. To this end, photosite rows 200, 202, 204, 206, 208, 210 are provided in two groups 1 and 11 of three rows each. Photosite rows 200, 202, 204 are provided with associated storage registers 212, 214, and shift registers 216, 218, while photosite rows 206, 208, 210 are provided with associated storage registers 220, 222, and shift registers 224, 226. The photosite rows are arranged generally as discussed for the arrangement in FIG. 2. Each group of three rows of photosites, includes photosite rows suitable for detection of blue, red and green light. The blue photosite rows may be comprised of photodiodes. When a row of photodiodes is used for the blue photosites, they are located in the respective groups furthest from the storage registers so that data is not passed through them, but rather is passed only out from them. Each corresponding row of photosites, e.g. the two blue rows of photosites, are offset from each other about approximately ½ photosite width to provide the corresponding photosites in an overlapping arrangement, whereby the image area is covered by two photosites.

It will no doubt be appreciated that the invention contemplates an improved method and arrangement for the movement of data from a photosite row through succeeding photosite rows, storage registers and shift registers to an output. It is well within the contemplation of the invention to provide a greater or lesser number of photosite rows, with selected color filters, as desired.

The invention has been described with reference to a preferred embodiment. Obviously, modifications will occur to others upon reading and understanding the specification taken together with the drawings. The described embodiments are only examples, and various alternatives, modifications, variations or improvements may be made by those skilled in the art from this teaching which are intended to be encompassed by the following claims.

We claim:

1. In a scanner system for detecting images on a preselected surface and generating an electronic representation thereof, said scanner system including an image detecting stage comprising:
   at least first, second and third parallel rows of sensors for generating charges representative of light of preselected wavelengths detected by said sensors;
   said sensors in any selected row being comprised of substantially similar construction suitable for detection of a preselected wavelength;
   said sensors in at least said second and third rows of a sensor type which facilitates transfer of charges into and out of said sensor;
   said sensor rows provided with transfer paths interconnecting each sensor in said first and second sensor rows in charge passing relationship with sensors in a successive row, and each said sensors in said third row to a storage means whereby charges generated at said sensors in said first row are transferred to said storage means through corresponding sensors in said second and third rows, charges generated at said sensors in said second row are transferred to said storage means through corresponding sensors in said third row and charges generated at said sensors in said third row are transferred into said storage means prior to transmission of all of said charges as output information.

2. The system as defined in claim 1 wherein said first row of sensors is comprised of photodiodes and said second and third rows of sensors are comprised of charge coupled devices.

3. The system as defined in claim 1 wherein said storage means includes at least first and second storage registers whereby said first storage register receives said charges from said third row sensors, and said second storage register receives said charges from said first storage register and passes said charges to a shift means for transmission to further data processing operations.

4. The system as defined in claim 3 wherein said first row of sensors is comprised of photodiodes, and said second and third rows of sensors are comprised of charge coupled devices.

5. The system as defined in claim 3 wherein said shift means is comprised of at least first and second shift registers, and said second storage register passes data derived from each of said sensor rows alternately to first and second shift registers.

6. The system as defined in claim 5 wherein said first row of sensors is comprised of photodiodes, and said second and third rows of sensors are comprised of charge coupled devices.

7. A color sensor array for use in image scanning systems whereby a preselected surface is scanned with the array to detect images thereon, and an electrical representation of said image is generated for transmission to a data processing system, said array comprising:
   at least six parallel rows of n sensors for generating electrical representations of selected portions of a detected image, said at least six rows comprised of at least first, second and third pairs of corresponding sensor rows, each said pair of corresponding sensor rows comprised of approximately the same number of substantially similar sensors responsive to a preselected wavelength of light, each sensor in one row of said row pair being offset from a corresponding sensor in the other row of said row pair by about ½ sensor width;

said sensors of at least said second and third sensor row pairs being of a type which facilitates transfer of charges through said sensor;

said sensor rows formed into at least two groups, each said group including at least one sensor row from each sensor row pair, said sensor rows of each of said groups provided with transfer paths interconnecting said first and second rows in each of said groups with a successive sensor row in the same group, and said third row of sensors in each of said groups connected with a storage means, whereby said sensors in a first row transfer charge into a second row; said sensors in said second row transfer charge into a third row; and said sensors in said third row transfer charge into storage means prior to transmission of all of said charges as output information.

8. A color sensor array as defined in claim 7 wherein said sensors in said second and third row pairs are comprised of charge coupled devices.

9. A color sensor array as defined in claim 7 wherein said first row pair of sensors is comprised of photodiodes, and said second and third row pairs of sensors are comprised of charge coupled devices.

10. A color sensor array as defined in claim 7 wherein said first sensor row in each of said sensor row groups are adjacent each other, said second sensor row of each group is adjacent said first sensor row in each group, and said third sensor row of each group is adjacent said second row in each group.

11. A color sensor array as defined in claim 7 wherein said storage means include at least two storage registers for receiving charges from said third sensor row.

12. A color sensor array as defined in claim 11 wherein each said storage register is located adjacent said third sensor row of each group.

13. A color sensor array as defined in claim 7 wherein said first sensor row in each of said sensor row groups is adjacent the first row of the other group.

14. A color sensor array as defined in claim 13 wherein said second sensor row of each group is adjacent said first sensor row in each group.

15. A color sensor array as defined in claim 14 wherein said third sensor row of each group is adjacent said second row in each group.

16. A color sensor array as defined in claim 15 wherein said storage means includes at least two storage registers for receiving charges from said third sensor row.

17. A color sensor array as defined in claim 16 wherein each said storage register is located adjacent said third sensor row of each group.

18. A method for generating data for the production of color image information including the steps of:
(a) providing a sensor array comprising at least first, second and third rows of light detecting sensors, said sensors in each said row of sensors responsive to a particular light wavelength to produce a charge representative of detected light of that wavelength, said sensors in said rows connected to either of a sensor in a succeeding row or a storage means in charge passing relationship; said storage means receiving said charges from said sensor rows for storage, and shift means for receiving said charges from said storage means and transmitting said charges as color image information to an information processor, whereby charges representative of light detected by a sensor in a sensor row are passed through successive rows, through said storage means to said shift means;
(b) providing an integration period during which said sensors are in a light detecting condition for a first predetermined amount of time;
(c) passing charges produced by said sensors in each said sensor row between successive integration periods to either a successive sensor row or said storage means;
(d) passing charges produced at said sensor rows from said storage means to said shift means for transmission to an information processor; and
(e) repeating step (b) after all the charges from the sensor rows reach said storage means.

19. A method for generating data for the production of color image information including the steps of:
(a) providing a sensor array comprising at least first, second and third rows of light detecting sensors, said sensors in each said row of sensors responsive to a particular light wavelength to produce a charge representative of detected light, said sensors in said rows connected to either of a sensor in a succeeding row or a storage means in charge passing relationship through a transfer gate between said sensors producing a charge and a sensor in a succeeding row or a first storage means; said first storage means connected in charge passing relationship to a second storage means through a transfer gate; said second storage means connected to a shift means, in charge passing relationship through a transfer gate between said second storage means and said shift means; and said transfer gates operable in sets to create a charge passing condition to allow transfer of charge therethrough;
(b) providing an integration period during which said sensors produce a charge representative of detected light;
(c) providing a charge passing condition in a first set of transfer gates connecting said first row of sensors, said first and second storage means and shift means for a second predetermined period, whereby charge is transferred from said first row of sensors to said shift means;
(d) providing a charge passing condition in a second set of transfer gates connecting said second row of sensors, said first row of sensors, said first storage means and said second storage means, for a third predetermined period whereby charge is transferred from said second row of sensors to said second storage means;
(e) providing a charge passing condition in a third set of transfer gates connecting said third row of sensors, said second row of sensors, said first row of sensors, and said first storage means, for a fourth predetermined period whereby charge is transferred from said third row of sensors to said first storage means;
(f) transferring charge from said shift means outwardly from said array as output information;
(g) providing a charge passing condition in a fourth set of transfer gates connecting said second storage means and said shift means for a fifth predetermined period, whereby charge is transferred from said second storage means to said shift means;

(h) providing a charge passing condition in a fifth set of transfer gates connecting said first storage means and said second storage means, for a sixth predetermined period whereby charge is transferred from said first storage means to said second storage means;

(i) repeating step (f);

(j) repeating step (g); and (k) repeating step (f).

20. The method for generating data for the production of color image information as defined in claim 19, wherein providing said charge passing condition in said said first, second and third transfer gate sets comprises:

providing a charge passing condition substantially simultaneously in each transfer gate of said transfer gate set; and successively providing a non-charge passing condition in each transfer gate of said transfer gate sets between said sensor rows and said storage means in the charge passing direction, commencing a selected time after providing said charge passing condition.

* * * * *